Figure 1:
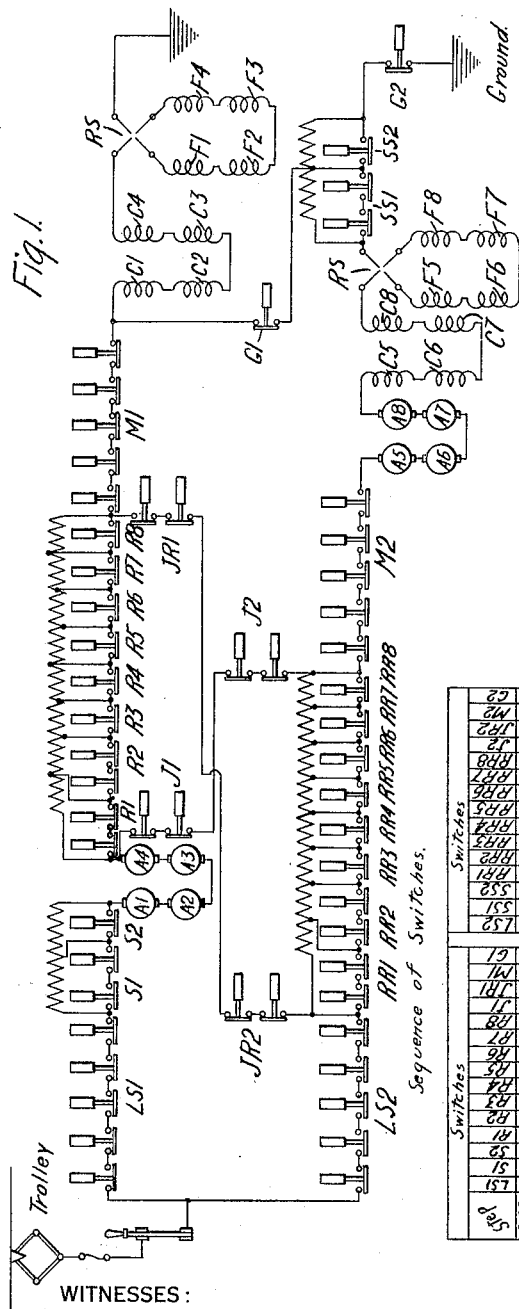

L. G. RILEY.
CONTROL SYSTEM.
APPLICATION FILED MAY 11, 1914.

1,189,292.

Patented July 4, 1916.
3 SHEETS—SHEET 1.

WITNESSES:
F. A. Lind
W. R. Coley

INVENTOR
Lynn G. Riley
BY
Wesley G. Carr
ATTORNEY

L. G. RILEY.
CONTROL SYSTEM.
APPLICATION FILED MAY 11, 1914.

1,189,292.

Patented July 4, 1916.
3 SHEETS—SHEET 3.

WITNESSES:
F. A. Lind.
W. R. Coley

INVENTOR
Lynn G. Riley
BY
Wesley G. Carr
ATTORNEY

UNITED STATES PATENT OFFICE.

LYNN G. RILEY, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,189,292. Specification of Letters Patent. Patented July 4, 1916.

Application filed May 11, 1914. Serial No. 837,776.

*To all whom it may concern:*

Be it known that I, LYNN G. RILEY, a citizen of the United States, and a resident of Wilkinsburg, in the county of Allegheny and State of Pennsylvania, have invented a new and useful Improvement in Control Systems, of which the following is a specification.

My invention relates to systems of control, and it has special reference to high-voltage direct-current control systems that are employed in propelling electric railway vehicles or the like.

The object of my invention is to provide a system of the above-indicated character which shall embody means for effecting the "bridging" type of transition from series to parallel relation of the motors while maintaining the field windings on the "ground" side of all the armatures throughout operation, whereby the field windings are subjected to a relatively low voltage only, and, consequently, economies in cost of insulating material for the field windings and in the space which they occupy in the machines may be effected. In addition, the liability of grounding of the field windings on the motor frame is reduced to a great extent.

More specifically stated, the object of my invention is to provide means for temporarily shunting a certain set of field windings during transition with a resistor having a resistance substantially equal to the resistance of the said field windings, whereby the direct series connections between the sets of field windings may be opened to complete the transition without disturbing electrical conditions in the several motor circuits.

In the prior art, various systems have been proposed for maintaining the field windings on the "ground" side of the armatures throughout the motor operation, but, so far as I am aware, all such systems utilize either the "open-circuiting" or the "shunting" types of transition, which have various well-known disadvantages, in comparison with the "bridging" type.

According to my present invention, therefore, I provide a system for maintaining the field windings on the "ground" side of all the armatures throughout operation and for effecting the "bridging" type of transition from series to parallel relation of the motors, thereby retaining, in the system, the advantages of this type of transition, such as the maintenance of substantially identical conditions in all the motors, including equal distribution of load at all times. As a means for accomplishing the desired result, I temporarily shunt one set of the field windings with a resistor of substantially equal resistance thereto during transition, thus reducing the current in the conductor joining the sets of field windings substantially to zero and permitting the opening of the circuit at this conductor to complete the motor transition and maintain balanced conditions in the motors.

Figure 2:
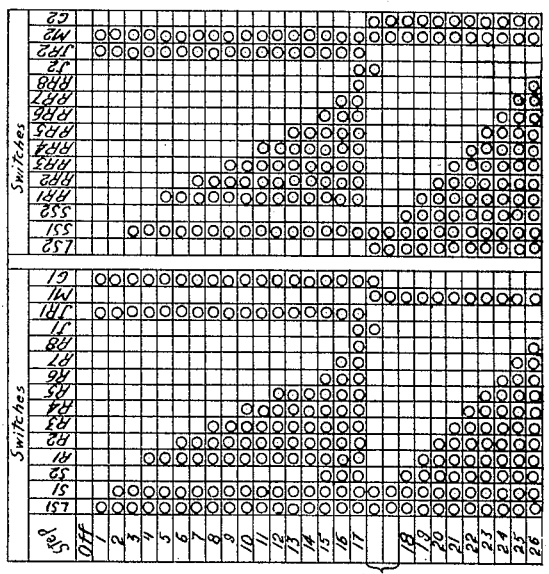
Figure 3:
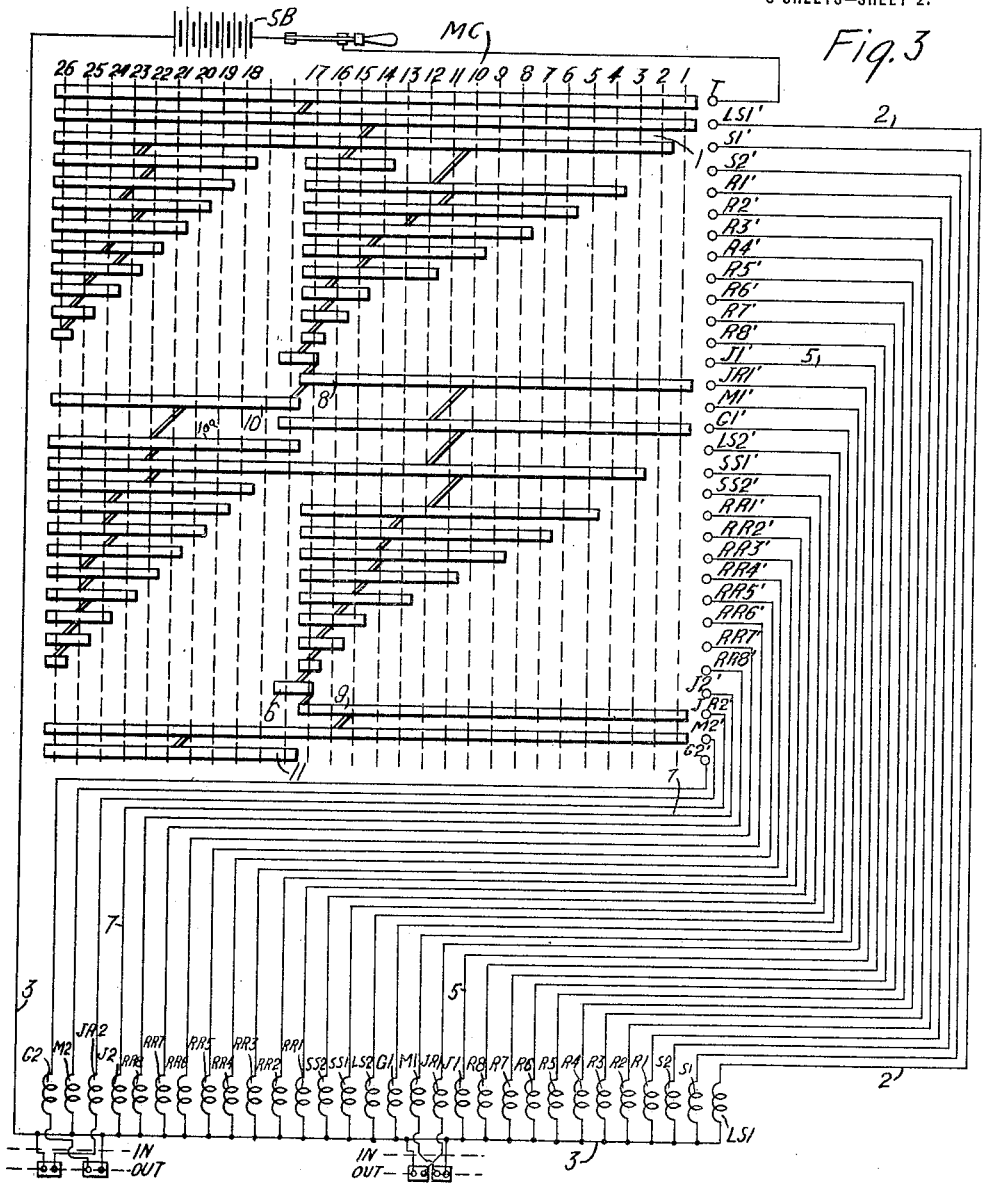
Figure 4:
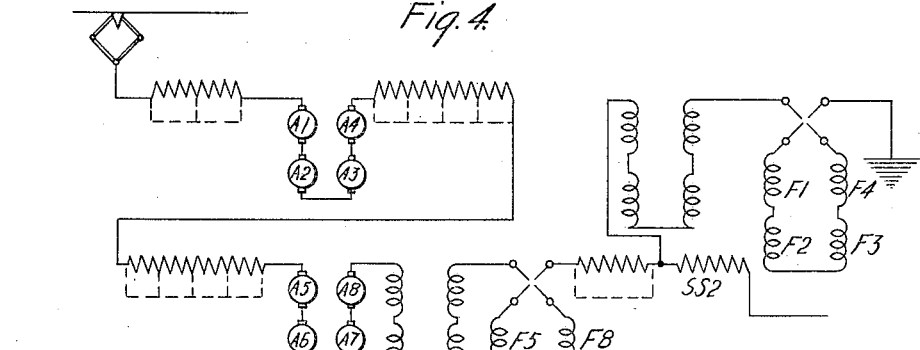
Figure 5:
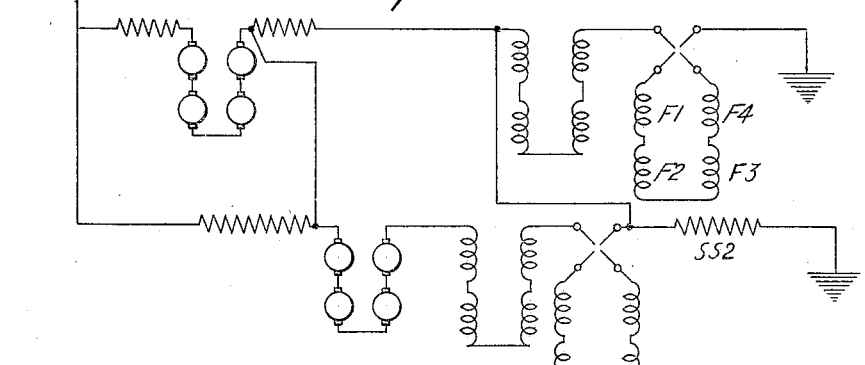
Figure 6:
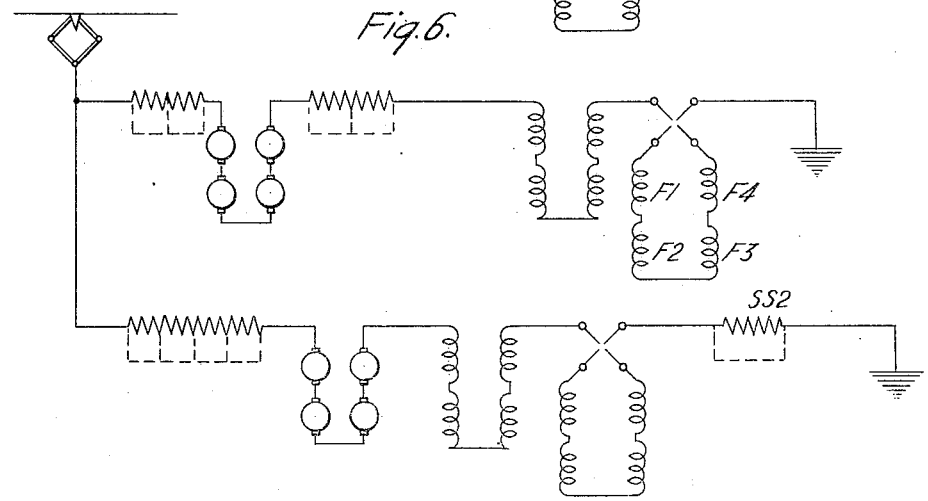

In the accompanying drawing, Figure 1 is a diagrammatic view of the main circuits of a control system embodying my invention; Fig. 2 is a chart of well-known form showing the sequence of operation of the switches shown in the system of Fig. 1; Fig. 3 is a diagrammatic view of an auxiliary control system for operating the system illustrated in Fig. 1 in accordance with the chart of Fig. 2; and Figs. 4, 5 and 6 are diagrammatic views of various sets of motor connections that are employed in my system.

Referring to Fig. 1 of the drawing, the system here shown comprises a plurality of coöperating supply-circuit conductors respectively marked "Trolley" and "Ground"; a plurality of electric motors respectively provided with armatures $A^1$ to $A^8$, inclusive, corresponding main field windings $F^1$ to $F^8$, inclusive, and corresponding auxiliary or commutating field windings $C^1$ to $C^8$, inclusive; a plurality of resistors, the various sections of which are adapted to be short circuited in a well-known manner by switches $S^1$, $S^2$, $R^1$ to $R^8$, inclusive, $RR^1$ to $RR^8$, inclusive, $SS^1$ and $SS^2$, respectively, a plurality of circuit-changing switches $LS^1$, $LS^2$, $M^1$, $M^2$, $G^1$, $G^2$, $JR^1$, $JR^2$, $J^1$ and $J^2$; and a plurality or reversing switching devices RS that are respectively associated with the sets of main field windings $F^1$ to $F^4$ and $F^5$ to $F^8$, and which may be of any familiar construction and operated in any suitable manner. The switches illustrated may be, in general, of any familiar type, several of them, however, being also of a multi-break type, in order to provide a plurality of points for simultaneously interrupting the circuit, a condition which is required by reason of the relatively high voltage of the system. The system illustrated is adapted for operation at 4800 volts, for instance, in which case, each armature is designed for an ultimate impressed electro-motive force of substantially 1200 volts. The resistor corresponding to the switch SS² is employed during transition of the motors from series to parallel relation only, and has a resistance which is substantially equal to the resistance of one of the sets of field windings, for a purpose to be hereinafter described.

Reference may now be had to Fig. 3, in which the auxiliary control system shown comprises a master controller MC, of any suitable type, that is adapted to occupy a plurality of motor operating positions 1 to 26, inclusive, and is provided with a plurality of movable contact members and a plurality of coöperating stationary contact members or control fingers T, LS¹′, S¹′, S²′, etc., to G²′, inclusive, the several control fingers, with the exception of finger T, being designated by reference characters which correspond to the particular switch the magnet coil of which they are respectively adapted to energize; and a source of energy for the several magnet coils, such as a storage battery SB or any other suitable means.

Inasmuch as the operation of the master controller is simple and well-known to those skilled in the art, only a brief description of its operation will be given. Assuming the master controller to be moved to its position 1, a circuit is completed from the source of energy SB through control finger T and LS¹′—which are bridged by a contact member 1 of the master controller, control conductor 2, the actuating coil of switch LS¹, and conductor 3 to the opposite terminal of the source of energy. The switches JR¹, JR², G¹ and M² are simultaneously closed by the energization of their respective magnet coils through corresponding control fingers of the master controller. The main circuit connections are illustrated in Fig. 4.

In positions 2 to 17, inclusive, the various resistor short-circuiting switches are gradually and successively closed, in a well-known manner, to accelerate the motors to full-series relation, as indicated by the dotted lines in Fig. 4.

The transition of the sets of motors from series to parallel relation is accomplished as follows: In position 17 the control finger J¹′ engages a contact member 4 of the master controller whence circuit is completed through conductor 5 and the energizing coil of the switch J¹ to the negative conductor 3. The switch J¹ is thus closed, and its companion switch J² is substantially simultaneously energized, in a similar manner, through contact members 6 and J²′ and conductor 7. The switches JR¹ and JR² are next opened by the disengagement of contact members 8 and 9 and the control fingers JR¹′ and JR²′, respectively, and all the resistor short circuiting switches are also opened at substantially the same time by the disengagement of their respective sets of contact members. The switches LS², M¹ and G² are next closed through the engagement of the control fingers LS²′, M¹′ and G²′ with the contact members 10ª, 10 and 11, respectively, of the controller. The motor connections at this time are illustrated in Fig. 5. The switches J¹, J², and G¹ are then opened to complete the motor transition.

In positions 18 to 26 of the master controller, the various resistor short-circuiting switches are again gradually and successively closed to accelerate the sets of motors to full parallel relation. The initial parallel relation of the sets of motors is indicated by the solid lines in Fig. 6, and the gradual short-circuiting of the various resistors is indicated by the dotted lines. It will be noted that the closure of the G² switch during transition temporarily shunts the set of field windings F¹ to F⁴, which is nearer to the "ground" conductor with the resistor SS², which has a resistance that is substantially equal to the resistance of the set of field windings referred to. By reason of this fact, the current in the conductor that directly connects the two sets of field windings is reduced to substantially zero, and the opening of the circuit through this conductor, by the actuation of the switch G¹, is accomplished without disturbing the electrical conditions in the several motor circuits in any way.

It will thus be observed that the several motors are initially connected in series circuit relation, the armatures and the field windings being connected in groups, and the two groups of field windings being connected between the "ground" side of the armatures and the "ground" conductor. During transition, the set of field windings that is nearer to the "ground" side of the circuit is temporarily connected in parallel relation with a resistor, the resistance of which is substantially equal to the set of field windings, and the direct series connection between the two sets of field windings is thereupon opened without unbalancing the electrical conditions in the several motor circuits.

I do not wish to be restricted to the specific circuit connections or arrangement of parts herein set forth, but desire that only such limitations shall be imposed as are indicated in the appended claims.

I claim as my invention:

1. In a system of control, the combination with a supply circuit, and a plurality of dynamo-electric machines severally provided with a plurality of coöperating windings, of means for effecting a transition of the machines from one circuit relation to another wherein the ultimate machine voltage is substantially twice the machine voltage in the first relation while maintaining substantially identical conditions in all the machines, the corresponding windings of all the machines remaining on a predetermined side of all the other windings throughout the operation.

2. In a system of control, the combination with a supply circuit, and a plurality of dynamo-electric machines severally provided with armatures and field windings, said field windings being located on the "ground" side of the armatures, of means for effecting a transition of the machines from series to parallel relation while maintaining substantially identical conditions in all the machines, the field windings remaining on the "ground" side of all the armatures throughout the operation.

3. In a system of control, the combination with a supply circuit and a plurality of electric motors severally provided with armatures and field windings, said field windings being located on the "ground" side of all the armatures, of means for effecting "bridging" transition of the motors from series to parallel relation, the field windings remaining on the "ground" side of all the armatures throughout the operation.

4. In a system of control, the combination with a supply circuit, a plurality of electric motors fed therefrom and severally provided with armatures and with series field windings which are initially directly connected and located on the "ground" side of the armatures, and a plurality of resistors, of means for gradually excluding the resistors from circuit to accelerate the motors to full series relation, means for effecting "bridging" transition of the motors from series to parallel relation, including means for temporarily shunting one set of field windings with a certain resistor prior to opening the direct series connection between the sets of field windings, and means for accelerating said motors to full parallel relation, the field windings remaining on the "ground" side of all the armatures throughout the operation.

5. In a system of control, the combination with a supply circuit, a plurality of electric motors fed therefrom and severally provided with armatures and with series field windings which are initially directly connected and located on the "ground" side of the armatures, and a plurality of resistors, of means for gradually excluding the resistors from circuit to accelerate the motors to full series relation, means for effecting "bridging" transition of the motors from series to parallel relation, including means for temporarily shunting one set of field windings with a certain resistor prior to opening the direct series connections between the sets of field windings, said resistor then remaining in circuit with the second set of field windings, and also including means for reinserting all of said resistors in circuit, and means for again gradually excluding the resistors from circuit to accelerate the motors to full parallel relation, the field windings remaining on the "ground" side of all the armatures throughout the operation.

6. In a system of control, the combination with a supply circuit of relatively high voltage, a plurality of electric motors fed therefrom and severally provided with armatures and with field windings which are initially directly connected and located on the "ground" side of the armatures, and a plurality of resistors one of which has a resistance substantially equal to the resistance of one set of the field windings, of means for gradually excluding the resistors from circuit to accelerate the motors to full series relation, and means for effecting "bridging" transition of the motors from series to parallel relation, including means for temporarily shunting said one set of the field windings with the said resistor of equal resistance to reduce the current in the direct series connection between the sets of field windings to substantially zero, whereby said connection may be opened to complete said transition without changing electrical conditions in the several motor circuits, the field windings remaining on the "ground" side of all the armatures throughout the complete motor operation.

7. In a system of control, the combination with a supply circuit, a plurality of electric motors fed therefrom and severally provided with armatures and with field windings which are initially directly series-connected to the "ground" side of the supply circuit, and a plurality of resistors one of which has a resistance substantially equal to the resistance of the set of the field windings that is nearer to the "ground" side of the circuit, of means for gradually excluding the resistors from circuit to accelerate the motors to full series relation, means for effecting "bridging" transition of the motors from series to parallel relation including means for temporarily paralleling said one set of the field windings and the said resistor of equal resistance from the "ground" side of the other set of field windings to the "ground" side of the circuits to reduce the current in the direct series connection between the sets of field windings to substantially zero, whereby said connection may be opened to complete said transition while maintaining substantially identical conditions in the several motor circuits.

8. In a system of control, the combination with a supply circuit, and a plurality of electric motors severally provided with armatures and field windings, said field windings being located on a predetermined side of all the armatures, of means for effecting a transition of the motors from series to parallel relation while maintaining substantially identical conditions in all the motors, the field windings remaining on said predetermined side of all the armatures throughout the operation.

9. In a system of control, the combination with a supply circuit, and a plurality of electric motors severally provided with armatures and field windings, said field windings being located on a predetermined side of all the armatures, of a translating device, and means for effecting "bridging" transition of the motors from series to parallel relation, including means for temporarily shunting one set of field windings with said device prior to opening the direct series connection between the sets of field windings, the field windings remaining on said predetermined side of all the armatures throughout the operation.

10. In a system of control, the combination with a supply circuit, and a plurality of electric motors severally provided with armatures and field windings, said field windings being located on the negative side of all the armatures, of a translating device having a resistance substantially equal to that of one set of field windings, and means for effecting "bridging" transition of the motors from series to parallel relation, including means for temporarily shunting said set of field windings with said device prior to opening the direct series connection between the sets of field windings, the field windings remaining on the negative side of all the armatures throughout the operation.

11. The method of effecting transition from series to parallel relation of a plurality of electric motors having their field windings permanently remaining on the negative side of the armatures that consists in effecting a direct connection between the motor armatures, connecting one set of armatures to one supply-circuit conductor, shunting one set of field windings through a circuit of predetermined resistance, connecting the shunted field windings to the other set of armatures, and opening the direct connections between the sets of armatures and the sets of field windings, respectively.

12. The method of effecting transition from series to parallel relation of a plurality of electric motors having their field windings permanently remaining on the negative side of the armatures, that consists in effecting a direct connection between the motor armatures, connecting one set of armatures to the positive supply-circuit conductor, shunting one set of field windings through a circuit having an equal resistance, connecting the shunted field windings to the other set of armatures, and opening the direct connections between the sets of armatures and the sets of field windings, respectively.

In testimony whereof I have hereunto subscribed my name this 29th day of April, 1914.

LYNN G. RILEY.

Witnesses:
B. B. Hines,
M. C. Merz.

Copies of this patent may be obtained for five cents each, by addressing the "Commissioner of Patents, Washington, D. C."